March 27, 1928. 1,663,719
J. MORLEY
PROCESS OF MAKING DOUGHNUTS AND OTHER FOOD PRODUCTS
Filed Dec. 26, 1922
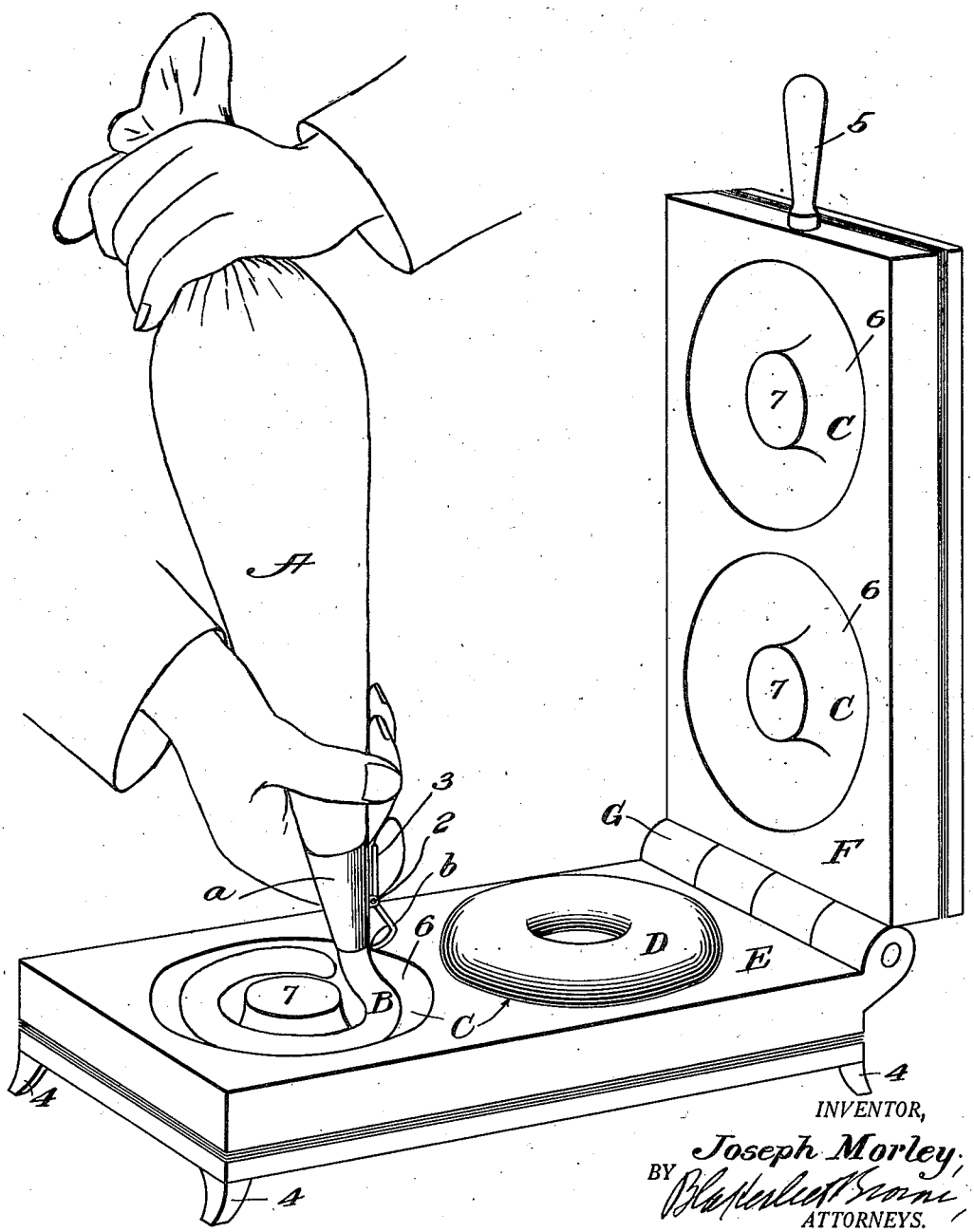
INVENTOR,
Joseph Morley,
BY
ATTORNEYS.

Patented Mar. 27, 1928.

1,663,719

UNITED STATES PATENT OFFICE.

JOSEPH MORLEY, OF LOS ANGELES, CALIFORNIA, ASSIGNOR OF FIVE-SIXTEENTHS TO RUDOLPH A. DALLUGGE, OF LOS ANGELES, CALIFORNIA.

PROCESS OF MAKING DOUGHNUTS AND OTHER FOOD PRODUCTS.

Application filed December 26, 1922. Serial No. 608,960.

This invention relates to a process of making doughnuts and other food products, such as crullers, dumplings, pretzels, muffins, pie crust and other similar edibles having a body of flour dough. In accordance with ordinary present day practice, such food products are made by forming up the body into suitable dimensions and shape and then frying the same in a bath of liquid fat or grease. The resultant food product ordinarily absorbs too much of such fat or grease in the frying process and soon after cooking becomes heavy and soggy and likewise distasteful to many persons, particularly, inasmuch as the excessive absorbed grease shortly commences to deteriorate, adding an unpleasant flavor to the product and producing deleterious effects upon the digestive organs of the consumer.

In accordance with the present invention, the food product is initially formed up into a dough body throughout which a certain amount of fat or grease or shortening is homogeneously or uniformly distributed, being just sufficient in quantity to give a meaty flavor and proper body texture and to provide for a certain amount of such shortening exuding under the action of heat to cook or fry upon the surface of the body and produce a browned surface with a suitable crust or skin. This eliminates entirely the use of a bath of fat, shortening or grease, with the resultant above-mentioned absorption of such materials which is objectionable, for the reasons stated, and also involves waste of material. I have estimated that in the use of the present process in the manufacture of doughnuts of standard size, approximately 3½ cents per dozen represents the saving in value of grease or shortening as over the amount involved in the use of the old grease bath frying process.

With the above and other objects in view, the invention consists in the novel and useful combination and association or sequence of steps hereinafter disclosed, reference being had to the accompanying drawing, illustrating the carrying on of the process in one manner and by the use of one or two convenient or preferably auxiliary agents.

In carrying on the process the dough stock or plastic dough is preferably supplied through the agency of a flexible or compressible sack or container A having a discharge spout or nozzle $a$, the flow or discharge of the plastic dough B through or from which is regulated by a valve or cap $b$ pivotally mounted as at 2 upon such spout and provided with a finger-piece 3 whereby the same may be conveniently held in opened position by the hand that supports and guides the lower portion of the container or receptacle A, as shown in the drawing. The other hand of the operator or baker is brought to bear upon the sack or container A in such manner as to squeeze and press the plastic dough through the spout $a$, preferably, but not necessarily, into a mold C, which, as shown in the drawing for utilization in making doughnuts such as D, comprises a pair of plates E and F, hingedly connected as at G, one being shown as having feet 4 for mounting the same upon a suitable support, and the other having a hand-grip or handle 5 at the free end for relatively manipulating such plates, either to separate them in pivotal movement for filling the mold or molds in the lower plate E with dough, or to extract the cooked products, or to bring such plates into close relation for the cooking or baking or frying operation, after the mold or molds has or have been supplied with the dough stock. Such mold C is shown as comprising an annular depression 6 in the plate E or F surrounding a substantially central core 7, fixed to the plate, and the dough is squeezed from the container A into such annular space 6, or otherwise directed thereto, around the core 7. The plate E is indicated as provided with two such molds C, as is the plate F, such molds when brought into registration in pairs, by bringing the plates together, constituting a complete mold formation or dual mold formation within which the doughnut is cooked, baked or fried. It will be understood that where such mold or mold members is or are used the same may be widely varied as to shape, form, conformation or design or dimensions, all in accordance with the food product under consideration.

The plastic dough stock B is permeated with a suitable but not excessive amount of fat, or grease, homogeneously and substantially uniformly distributed through the mass of dough stock, and when the mold or mold members with the contents of dough so or otherwise provided, is or are subjected to heat in any suitable manner and at a suitable temperature, the dough is baked or cooked to the desired degree, and the heat causes an appreciable amount of fat, grease or shortening to exude from the dough stock, and, upon reaching the surface of such dough stock, a frying action of the dough stock and such shortening takes place at the surface of the body of dough, just sufficient to produce a thin crust or skin of relatively harder or tougher texture at the surface, and to likewise produce a brown, wholesome and pleasing appearance. After subjection of the mold or mold members to heat for a sufficient predetermined time, the mold members are relatively separated and the finished food product removed. A dough stock suitable for carrying my invention into practice may consist of the following named ingredients: 6 cups flour; 2⅓ cups milk; 1 cup fat; 1½ cups sugar; 2 teaspoons salt; 3 teaspoons mace; 1 teaspoon nutmeg; 8 teaspoons baking powder; 4 teaspoons flavoring; 3 eggs well beaten. In the recipe just recited, I have suggested the use of a cup of fatty matter in proportion to the other constituents therein enumerated, but in this respect it should be understood that the proportion of fatty matter may be varied to suit the requirements.

A finer and more healthful and palatable food product is produced in the use of this process and much saving of material ensues; and the necessity of maintaining an objectionable hot bath of grease or shortening is entirely eliminated with all the attendant unpleasantness and danger. No greasing of the mold or molds is required.

Having thus disclosed my invention, I claim and desire to secure by Letters Patent:

The herein described process of making doughnuts which consists in first providing a doughnut stock, adding a quantity of fatty matter to the stock, working the mass to thoroughly distribute the fatty matter throughout same, shaping the mass, enclosing the shaped mass within baking irons, heating the irons, to cause the fatty matter contained in the doughnut stock to be expressed therefrom and to assume the form of a hot frying film of fat between the mass and said irons, said heating also being effective to cause the doughnut stock to be baked with a thin crust at its surface, and then removing the baked product from the irons.

In testimony whereof, I have signed my name to this specification.

JOSEPH MORLEY.